United States Patent (10) Patent No.: US 7,412,841 B2
Ueda et al. (45) Date of Patent: Aug. 19, 2008

(54) TURBO CHILLER, COMPRESSOR THEREFOR, AND CONTROL METHOD THEREFOR

(75) Inventors: Kenji Ueda, Aichi-ken (JP); Yasushi Hasegawa, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 472 days.

(21) Appl. No.: 11/010,385

(22) Filed: Dec. 14, 2004

(65) Prior Publication Data

US 2005/0144965 A1 Jul. 7, 2005

(30) Foreign Application Priority Data

Dec. 18, 2003 (JP) .............................. 2003-420567

(51) Int. Cl.
*F25B 49/00* (2006.01)
(52) U.S. Cl. .......................... 62/228.3; 62/201; 62/209; 417/22; 417/42
(58) Field of Classification Search ............. 62/125, 62/215, 228.4, 176.3, 226, 491, 296, 222
See application file for complete search history.

(56) References Cited

U.S. PATENT DOCUMENTS 4,546,618 A * 10/1985 Kountz et al. ............... 62/201
5,355,691 A * 10/1994 Sullivan et al. ............. 62/201
5,798,941 A * 8/1998 McLeister ................... 700/282
5,873,257 A * 2/1999 Peterson ...................... 62/180
5,908,462 A * 6/1999 Batson ......................... 701/100

FOREIGN PATENT DOCUMENTS

JP 1-200095 8/1989

* cited by examiner

*Primary Examiner*—Cheryl J. Tyler
*Assistant Examiner*—John Pettitt
(74) *Attorney, Agent, or Firm*—Westerman, Hattori, Daniels & Adrian, LLP.

(57) ABSTRACT

A compressor for a turbo chiller that can stably and efficiently operate in various operating states is provided. An aerodynamic feature map showing a rotating stall line at which rotating stall occurs is provided on a map represented by a flow parameter reflecting the volume flow based on the output thermal capacity of the chiller and by a pressure parameter reflecting the head based on the evaporator pressure and the condenser pressure. A minimum rotation speed obtaining unit obtains a minimum rotation speed from the pressure parameter and the rotating stall line on the aerodynamic feature map in the current operating state, and a rotation speed greater than or equal to the minimum rotation speed thus obtained is designated to the inverter.

4 Claims, 5 Drawing Sheets

TURBO CHILLER, COMPRESSOR THEREFOR, AND CONTROL METHOD THEREFOR

BACKGROUND OF THE INVENTION

1. Field of the Invention

The present invention relates to a turbo chiller, a compressor therefor, and a control method therefor in which surging can be avoided.

2. Description of Related Art

In turbo compressors, such as centrifugal compressors, having a high head and a low volume flow, rotating stall and accompanying surging generally occur.

As a control method for this kind of centrifugal compressor, a method is known in which the relationship between the intake temperature of the centrifugal compressor and the minimum rotation speed that avoids surging is obtained in advance, and the rotation speed of the centrifugal compressor is controlled on the basis thereof (see, for example, Japanese Unexamined Patent Application, First Publication No. HEI 1-200095 (page 4 lower right to page 5 upper left, and FIGS. 1 and 2 therein)).

However, when the turbo compressor is used in a turbo chiller, the turbo compressor experiences a large influence on the operating point as a result of variations in the cooling capacity. This is demonstrated below in the case of chilled water output. For example, in the event of changes in the chilled water inlet temperature in a chilled water obtaining device provided in the evaporator of the turbo chiller, the cooling capacity changes so as to maintain the chilled water outlet temperature at a constant set value. When the cooling capacity changes, the condenser pressure and the condenser temperature at the high-pressure side also change accordingly. At this time, as in the known art described in the above-mentioned Japanese Unexamined Patent Application, First Publication No. HEI 1-200095, since the compressor rotation speed is controlled on the basis of the compressor inlet temperature alone, the operating point of the turbo compressor cannot be accurately determined, and thus operation in a stable region where rotating stall is avoided cannot be achieved.

Accordingly, by controlling the compressor rotation speed of the conventional turbo chiller, it is operated at a rotation speed at which rotating stall does not occur for the entire range of capacities at a prescribed compression ratio ("head").

However, the rotation speed when operating at partial load becomes higher than the minimum rotation speed at which rotating stall can be avoided, thus resulting in wasteful energy consumption.

BRIEF SUMMARY OF THE INVENTION

Accordingly, in light of the problems described above, an object of the present invention is to provide a turbo chiller, a compressor therefor, and a control method therefor that can operate stably and efficiently under various operating conditions.

In order to solve the above-mentioned problems, the present invention adopts the following features.

A compressor of a turbo chiller according to the present invention includes an inverter-driven electric motor which is driven by an inverter and subjected to rotation speed control; a turbo compressor unit which is rotated by the inverter-driven electric motor to compress an intake refrigerant; and a rotation-speed control device which controls the rotation speed of the turbo compressor unit by means of a control signal transmitted to the inverter. The rotation speed control device is provided with an aerodynamic feature map indicating a rotating stall line at which rotating stall occurs, on a map represented by a first parameter reflecting a volume flow based on the output thermal capacity of the refrigerator and by a second parameter reflecting a head based on an evaporator pressure, a condenser pressure, and the output thermal capacity. The rotation-speed control device includes a minimum rotation speed obtaining unit that obtains a minimum rotation speed from the second parameter and the rotating stall line on the aerodynamic feature map at the current operating state; and a rotating speed instructing unit for instructing the inverter to drive at a rotation speed greater than or equal to the minimum rotation speed obtained in the minimum rotating speed obtaining unit.

The intersection of the rotating stall line and the straight line where the second parameter, reflecting the head, is constant indicates the minimum value of the first parameter in the stable state where rotating stall does not occur. Since the first parameter reflects the volume flow, the minimum value of the first parameter represents the minimum rotation speed of the compressor. If the compressor is operated at a rotation speed greater than or equal to this minimum rotation speed, the compressor can constantly be operated in a stable state.

Also, since the first parameter is arranged to be based on the output thermal capacity and the second parameter is arranged to be based on the evaporator pressure, the condenser pressure, and the output thermal capacity, an operating state of the compressor that closely corresponds to the operating conditions of the turbo refrigerator can be determined. Therefore, the most suitable minimum rotation speed for the current operating state of the compressor can be set.

Here, the output thermal capacity of the refrigerator means the cooling capacity of the evaporator in the case of chilled water output, and means the heat release capacity of the compressor in the case of warm water output.

In addition, a compressor for a turbo chiller according to the present invention may include a chilled water obtaining device which takes in chilled water from the evaporator, the output thermal capacity being calculated on the basis of a chilled water outlet temperature of the chilled water obtaining device in the case of chilled water output; or a warm water obtaining device which takes in warm water from the condenser, the output thermal capacity being calculated on the basis of a warm water outlet temperature of the warm water obtaining device in the case of warm water output. The rotation speed control device includes a set minimum rotation speed obtaining unit which obtains a set minimum rotation speed from the rotating stall line on the aerodynamic feature map based on a set chilled water outlet temperature or a set warm water outlet temperature, which have set values; and a current minimum rotation speed obtaining unit which obtains a current minimum rotation speed from the rotating stall line on the aerodynamic feature map based on a current chilled water outlet temperature or warm water outlet temperature. The rotation speed instructing unit instructs the inverter to drive at a instructed rotation speed that is equal to or greater than the higher rotation speed of the set minimum rotation speed and the current minimum rotation speed.

Since the set minimum rotation speed is obtained on the basis of the set chilled water outlet temperature and the compressor is operated at a rotation speed that does not fall below this rotation speed, the compressor can be operated in a stable region where rotating stall and accompanying surging do not occur.

Also, since the minimum rotation speed is obtained on the basis of the current chilled water outlet temperature and, after comparing this current minimum rotation speed and the set minimum rotation speed, a rotation speed higher than the larger rotation speed is used, the compressor is never operated in a rotating stall (surging) region, even if there is difference between the set value and the current value of the chilled water outlet temperature.

For example, when the current chilled water outlet temperature rises above the set chilled water outlet temperature, in order for a lower set chilled water outlet temperature to produce a larger volume flow, the set minimum rotation speed should be higher than the current minimum rotation speed. In this case, since the inverter is instructed to drive at a rotation speed greater than or equal to the higher set minimum rotation speed by the rotation speed instructing unit of the rotation speed control device, the compressor is operated in the stable region, and the chilled water outlet temperature is controlled so as to fall from the current value to the set value. In this way, the chilled water outlet temperature is controlled so as to converge towards the set value.

On the other hand, in the event that the current value of the chilled water outlet temperature falls below the set value, the head is insufficient and the operation tends to be in the unstable region. In this case, in order to recover from the insufficient head, the inverter is instructed to drive at a rotation speed greater than or equal to the current minimum rotation speed, which is the higher rotation speed, and operation in the stable region can be realized. In this way, control is carried out so as to achieve operation in the stable region.

From the above, even if the current value of the chilled water outlet temperature is different from the set value, it is possible to operate the compressor in the stable region where rotating stall and accompanying surging do not occur, and it is thus possible to efficiently operate the compressor at the minimum required rotation speed.

In addition, a compressor for a turbo chiller according to the present invention may include an inlet vane which adjusts the flow rate of refrigerant flowing into the turbo compressor unit, and the aerodynamic feature map is a maximum-opening map which shows data at the time of maximum opening of the inlet vane. The rotation speed control device includes an operating state determining unit which determines, according to the maximum-opening map, whether the current operating state is in a stable region where rotating stall does not occur or in an unstable region where rotating stall occurs; and a vane-opening-dependent minimum rotation speed obtaining device which obtains a vane-opening-dependent minimum rotation speed for the current vane opening by correcting a minimum rotation speed obtained from the maximum-opening map. When the operating state determining unit determines that the current operating state is in the stable region, the rotation speed instructing unit instructs the inverter to drive at a instructed rotation speed that is greater than or equal to the higher rotation speed of the set minimum rotation speed and the current minimum rotation speed; and when the operating state determining device determines that the current operating state is in the unstable region, the rotating speed instructing unit instructs the inverter to drive at the vane-opening-dependent minimum rotation speed obtained by the vane-opening-dependent minimum rotation speed obtaining unit.

Since the operating state determining unit for determining whether the operating state of the compressor is in a stable region or an unstable region when the vane is fully open, by means of the maximum-opening map, is provided, if control is carried out by referring to the maximum-opening map, even in the event of the current vane opening falling to or below the maximum opening, the vane can be fully opened to maintain the stable state.

In the case where the current operating state is in the stable region in the maximum-opening map, because the inverter is instructed to drive at an instructed rotation speed greater than or equal to the higher rotation speed of the set minimum rotation speed and the current minimum rotation speed by the rotation speed instructing unit, the maximum vane opening at the required minimum rotation speed, for maintaining the operating state in the stable region, can be realized.

In the case where the current operating state is in the unstable region in the maximum-opening map, because the inverter is instructed to drive at the vane-opening-dependent minimum rotation speed by the rotation speed instructing unit, the compressor is constantly operated in the stable region.

In this way, because the compressor can be operated so as not to fall below a minimum rotation speed at which rotating stall does not occur, whether the current operating state of the compressor is in the stable region or the unstable region in the maximum inlet vane opening map, it is possible to increase the inlet vane opening to the maximum possible opening. Accordingly, it is possible to use a range of inlet vane openings, from the current value to the maximum value, using final temperature adjustment of the chilled water outlet temperature.

Also, since it is possible to command maximum vane opening in response to various operating states, it is possible to operate the compressor with extremely low loss, caused by flow resistance occurring when then inlet vane opening is small, and with high efficiency.

According to the present invention, a turbo chiller including the above-described turbo chiller compressor can be provided.

In addition, a turbo chiller according to the present invention may include an expansion valve opening control device which controls the degree of opening of an expansion valve provided between the condenser and the evaporator. The expansion valve opening control device controls the expansion valve to be in a speed-of-sound reduction transition region, from a liquid phase state to a vapor-liquid two-phase state, where the rate of fall of the speed of sound of the refrigerant is reduced.

It is known that the flow speed of a liquid flowing in a pipe is limited to the speed of sound in the liquid. The speed of sound of the refrigerant exhibits a decreasing characteristic from the liquid phase to the vapor-liquid two-phase state. When the ratio of the liquid phase in the flow state of the vapor-liquid two-phase refrigerant falls, the speed of sound falls noticeably, and thereafter, there is a speed-of-sound reduction transition region where the rate of decrease of the speed of sound is reduced. Since the expansion valve is controlled to be in this speed-of-sound reduction transition region in the present invention, the amount of refrigerant can be stably regulated by adjusting the degree of opening of the expansion valve.

Accordingly, when controlling the expansion valve to be in the liquid phase by a method such as liquid-level control for maintaining a liquid column upstream of the expansion valve, as is done conventionally, the liquid surface of the refrigerant stored further upstream from the expansion valve (in the condenser) becomes higher. When the liquid surface of the refrigerant becomes higher, it becomes necessary to apply a pressure corresponding to this height to the condenser for forcing the liquid refrigerant through the expansion valve, which, as a result, increases the condenser pressure, thus requiring additional compressor power. Also, at the initial stage where the liquid refrigerant first enters the vapor-liquid two-phase state, because the speed of sound falls suddenly, control of the expansion valve becomes unstable.

On the other hand, entering the vapor-liquid two-phase state, in the region past the speed-of-sound reduction transition region, a large amount of vapor-phase refrigerant flows into the evaporator, resulting in a refrigerant gas leakage which reduces the cooling capacity by a corresponding amount, thus increasing the energy loss.

In the speed-of-sound reduction transition region, when the refrigerant is R134a, the ratio of vapor-phase refrigerant with respect to the total weight of refrigerant passing through the expansion valve is from 0.2 to 1.0, and preferably about 0.4.

In addition, the present invention provides a control method of a compressor of a turbo chiller including an inverter-driven electric motor that is driven by an inverter and subjected to rotation speed control, and a turbo compressor unit that is rotated by the inverter-driven electric motor to compress an intake refrigerant, the control method controlling the rotation speed of the turbo compressor unit by means of a control signal transmitted to the inverter. The control method includes utilizing an aerodynamic feature map indicating a rotating stall line at which rotating stall occurs, on a map that is represented by a first parameter reflecting a volume flow based on a cooling capacity of an evaporator and by a second parameter that reflects a head based on an evaporator pressure and a condenser pressure; obtaining a minimum rotation speed from the second parameter and the rotating stall line on the aerodynamic feature map in the current operating state; and instructing the inverter to drive at a rotation speed greater than or equal to the minimum rotation speed obtained in the minimum rotation speed obtaining step.

The turbo chiller compressor and the control method therefor of the present invention provide the following advantages.

Because the minimum rotation speed is obtained from the second parameter and the rotating stall line on the aerodynamic feature map in the current operating state, and because the maximum vane opening corresponding to the current operating state can be ordered, operation with low loss, caused by flow resistance occurring when the inlet vane opening is small, and with high efficiency is possible. Therefore, the chiller operating region when operating at partial load can be widened.

Also, because an aerodynamic feature map formed by using a first parameter based on the refrigeration capacity of the evaporator and a second parameter based on the evaporator pressure, the condenser pressure, and the refrigeration capacity is used, it is possible to determine an operating state of the compressor that closely corresponds to the operating conditions of the turbo chiller. Therefore, the most suitable minimum rotation speed for the current operating state of the compressor can be set, thus achieving efficient operation.

Furthermore, since an expansion valve opening control device for controlling the expansion valve to be in the speed-of-sound reduction transition region is provided, it is possible to stably adjust the amount of refrigerant flowing in the refrigeration cycle. Also, because the refrigerant can be controlled to be in the vapor-liquid two-phase region, the surface height of the liquid refrigerant in the condenser can be reduced as compared to the case where the refrigerant is controlled to be in the liquid phase, and therefore, unnecessary, wasteful compression can be avoided.

DETAILED DESCRIPTION OF THE INVENTION

An embodiment of the present invention will be described below with reference to the drawings.

Figure 1:
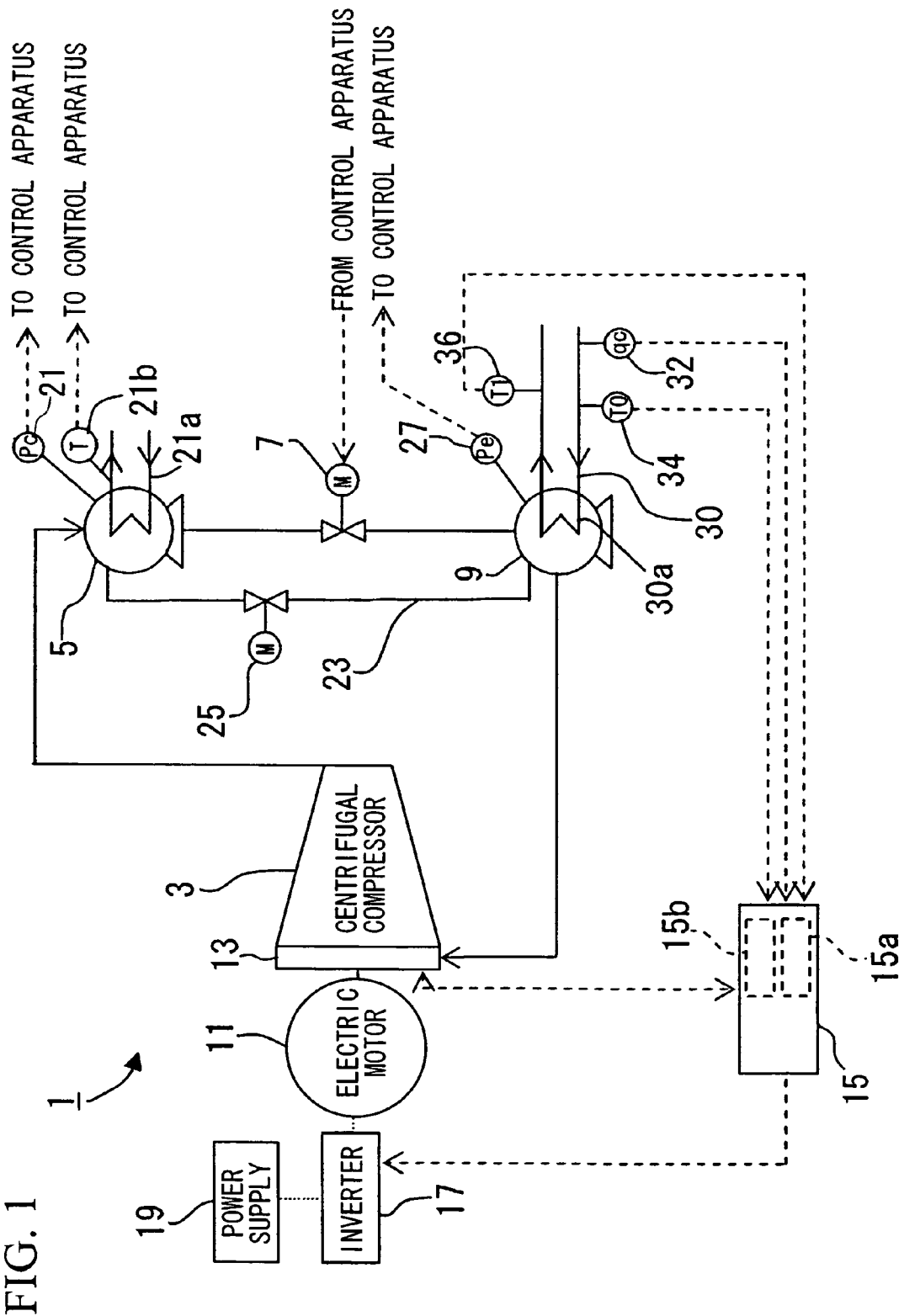
FIG. 1 is a schematic structural diagram showing a turbo chiller provided with a compressor according to an embodiment of the present invention.

A schematic structural diagram of a turbo chiller 1 is shown in FIG. 1.

The turbo chiller 1 has a centrifugal compressor (hereinafter referred to as compressor) 3, a condenser 5 which condenses the high-pressure gas refrigerant compressed by the centrifugal compressor 3, an expansion valve 7 which expands the high-pressure liquid refrigerant condensed in the condenser 5, and an evaporator 9 which evaporates the low-pressure liquid refrigerant expanded by the expansion valve 7.

The compressor 3 has a centrifugal impeller which is rotationally driven by an electric motor 11. An inlet vane 13 which adjusts the refrigerant flow rate is provided at the refrigerant inlet of the compressor 3. The degree of opening of this inlet vane 13 is controlled by a control apparatus 15.

The input frequency from a power supply 19 is designed to be modified by an inverter 17, and as a result, the rotation speed of the electric motor 11 is controlled. An instructed frequency transmitted to the electric motor 11 from the inverter 17 is modified by a rotation speed control unit (rotation speed control device) 15*a* which is provided inside the control apparatus 15.

A pressure sensor 21 which measures the refrigerant pressure Pc inside the condenser 5 is provided in the condenser 5. The output of this pressure sensor 21 is input to the control apparatus 15. In addition, a warm water obtaining device 21*a* which obtains the warm water by heat exchange with the refrigerant inside the condenser 21 is provided in the condenser 21. A warm water outlet temperature sensor 21*b* is provided at the warm water outlet of this warm water obtaining device 21*a*. The output of the warm water outlet temperature sensor 21*b* is input to the control apparatus 15.

The degree of opening of the expansion valve 7 is controlled by an expansion valve opening control unit 15*b* provided in the control apparatus 15.

HGBP piping (hot gas bypass piping) 23 is provided between the condenser 5 and the evaporator 9. The high pressure refrigerant gas inside the condenser 5 is able to flow to the evaporator 9 by means of this HGBP piping 23. An HGBP valve 25 is provided in the HGBP piping 23. By adjusting the degree of opening of this HGBP valve 25, the refrigerant flow rate in the HGBP piping 23 is adjusted, which ensures a sufficient intake refrigerant gas flow rate to the compressor 3 when the cooling capacity is low.

A pressure sensor 27 which measures the refrigerant pressure Pe inside the evaporator 9 is provided in the evaporator 9. The output of this pressure sensor 27 is input to the control apparatus 15.

Chilled water inlet/outlet nozzles (chilled water obtaining device) 30 for obtaining cooling heat from the evaporator 9 is provided in the evaporator 9. The evaporator 9 includes a heat exchange tube 30a through which the chilled water circulates. A portion of this heat exchange tube 30a is arranged to be located inside the evaporator 9, and as a result, the chilled water circulating inside is cooled.

A flowmeter 32 which measures the flow rate qc of chilled water flowing into the evaporator 9 and a chilled water inlet temperature sensor 34 which measures the inlet temperature T0 of the chilled water flowing into the evaporator 9 are provided in the heat exchange tube 30a upstream of the evaporator 9. A chilled water outlet temperature sensor 36 which measures the outlet temperature T1 of the chilled water flowing out from the evaporator 9 is provided at the chilled water outlet nozzle downstream of the evaporator 9. The outputs of the above-mentioned flowmeter 32, chilled water inlet temperature sensor 34, and chilled water outlet temperature sensor 36 are input to the control apparatus 15.

The rotation speed control unit 15a of the control apparatus 15 transmits to the inverter 17 an instructed frequency corresponding to the instructed rotation speed of the electric motor 11 based on state quantities (pressure, temperature, etc.) in the individual sections of the turbo chiller 1.

In addition, the expansion valve opening control unit 15b of the control apparatus 15 orders the degree of opening of the expansion valve 7 based on state quantities (pressure, temperature, etc.) in individual sections of the turbo chiller 1.

Of course, the control apparatus 15 also controls the degree of opening of the inlet vane 13, the degree of opening of the HGBP valve 25, and so on.

Figure 2:
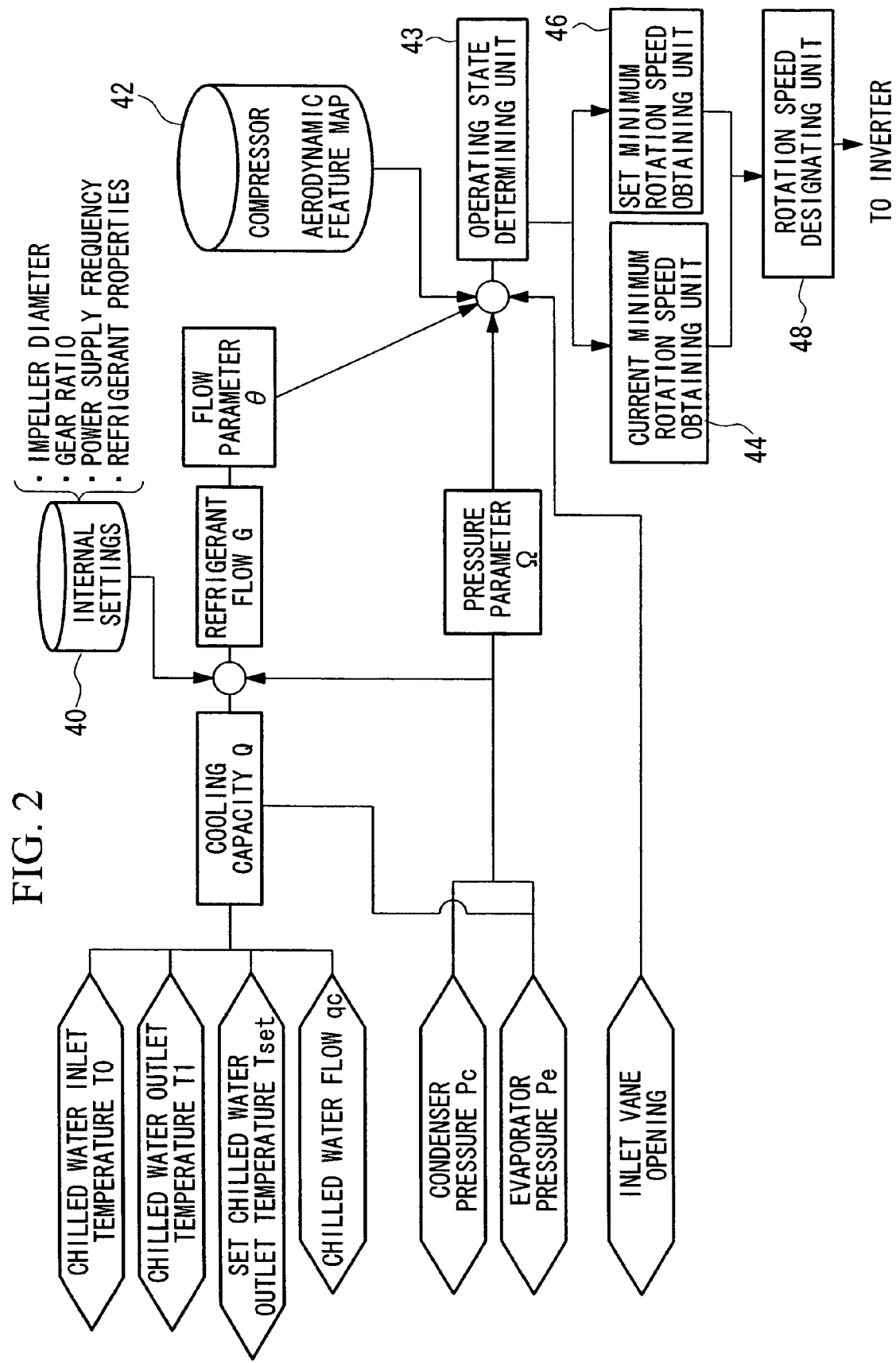
FIG. 2 is a block diagram showing a control apparatus of the present invention.

Next, using FIG. 2, the calculation of the instructed rotation speed, which is carried out in the rotation speed control unit 15a of the control apparatus 15, will be described.

The outer diameter D of the impeller, the gear ratio of a step-up gear provided between the electric motor 11 and the impeller, the power supply frequency (50 Hz or 60 Hz), physical properties of the refrigerant (enthalpy, specific gravity, saturation temperature, saturation pressure, and the like), and data such as the specific gravity and specific heat of the chilled water are stored in the control apparatus 15 as internal settings 40.

The cooling capacity Q of turbo chiller 1 can be obtained on the basis of the inlet temperature T0 and the outlet temperature T1 of the chilled water flowing in the evaporator 9 and the chilled water flow rate qc. Concretely, as shown in equation (1) below, multiplying the temperature difference between the outlet and inlet of the chilled water (T0−T1) by the chilled water flow rate qc and the specific heat Cw of the chilled water gives the cooling capacity Q.

$$Q = (T0 - T1) \times qc \times Cw \quad (1)$$

Based on this cooling capacity Q and the enthalpy difference $\Delta h$ of the refrigerant gas at the outlet and inlet of the compressor 11, the refrigerant flow rate G (mass flow rate) is obtained as shown in the following equation (2).

$$G = k \times Q / \Delta h \quad (2)$$

Here, k is a constant.

Then, based on the refrigerant flow rate Qv, obtained by substituting volumetric flow rate for the refrigerant flow rate G, the outer diameter D of the impeller, and the speed of sound a at the saturation temperature Te which is calculated from the pressure Pe of the evaporator 9, a flow parameter (1st parameter) $\theta$ can be obtained, as in equation (3) below. This flow parameter is a dimensionless number which is based on the intake volume flow of the compressor 3.

$$\theta = Q / (a \times D^2) \quad (3)$$

In this way, the flow parameter $\theta$ can be obtained from the cooling capacity Q and the evaporator pressure Pe, and since it is unrelated to the circumferential speed of the impeller, it differs from a flow coefficient $\psi d$, described later.

A pressure parameter (2nd parameter) $\Omega$ is a dimensionless number which is based on the head of the compressor 3; it can be obtained, as shown in equation (4) below, from the enthalpy difference $\Delta h$ of the refrigerant gas which is obtained from the condenser pressure Pc, the evaporator pressure Pe, and the saturation temperature Te calculated from the evaporator pressure Pe, and from the speed of sound a at the saturation temperature Te which is calculated from pressure Pe of evaporator 9.

$$\Omega = \Delta h / a^2 \quad (4)$$

In this way, the pressure parameter $\Omega$ is obtained from the condenser pressure Pc and the evaporator pressure Pe, and since it is unrelated to the circumferential speed of the impeller, it differs from a pressure coefficient $\mu$, described later.

As described below, the current operational state of the compressor 3 is estimated by means of the above-mentioned flow parameter $\theta$ and pressure parameter $\Omega$.

Figure 3:
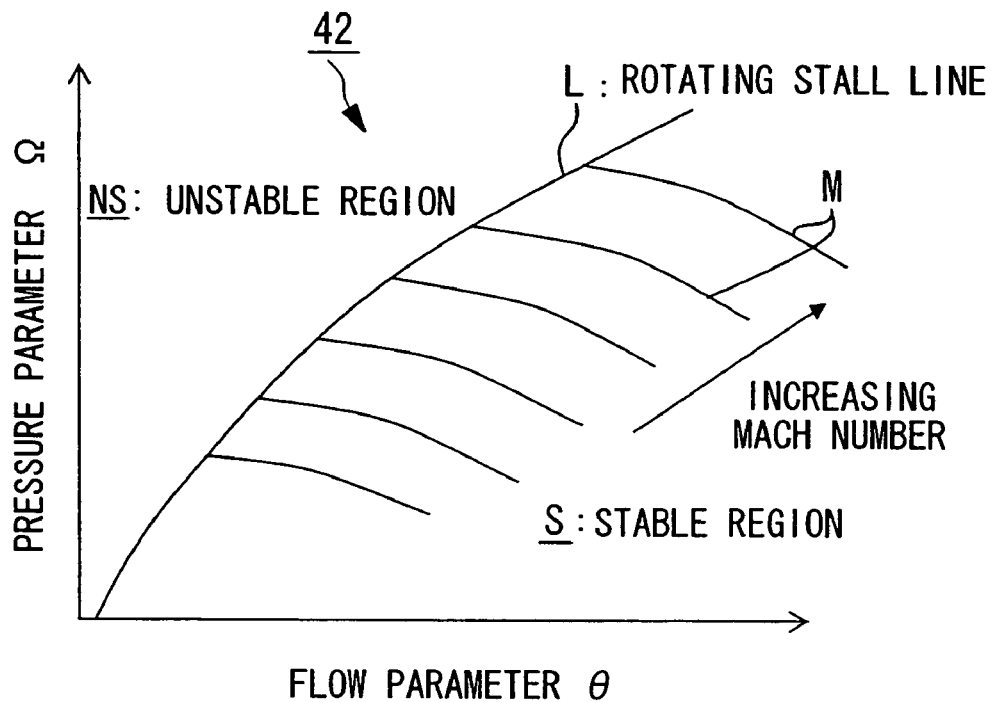
FIG. 3 is a graph showing an aerodynamic feature map of the present invention.

The rotation speed control unit 15a of the control apparatus 15 includes an aerodynamic feature map 42 of the compressor 3. This aerodynamic feature map 42 shows a rotating stall line L where rotating stall occurs in the compressor 3, on a map of the pressure parameter $\Omega$ versus flow parameter $\theta$, by carrying out detailed operating tests of the compressor 3 beforehand. For example, the aerodynamic feature map 42 shown in FIG. 3 can be obtained. In this aerodynamic feature map 42, the region below the rotating stall line L is a stable region S where rotating stall and surging do not occur, and the region above the rotating stall line L is an unstable region NS where rotating stall and surging occur. In this embodiment, this aerodynamic feature map 42 is for the case where the degree of opening of the inlet vane 13 is set at maximum, that is, 100% (maximum-opening map). In addition, in this map 42, a plurality of lines M of equivalent machine Mach number, each line indicating the condition under which constant machine Mach number, are shown, and the machine Mach number increases towards the top.

On the basis of the set chilled-water outlet temperature Tset, which is to be obtained by the evaporator 9, the rotation speed control unit 15a always stores the smallest set rotation speed Nfixf at which this set chilled-water temperature Tset is obtained.

Concretely, substituting for saturation temperature Te and using a rated refrigerant evaporator temperature Te0, which corresponds to set chilled water outlet temperature Tset, a rated pressure parameter $\Omega$set is obtained from equation (4).

From this rated pressure parameter $\Omega$set, the minimum set rotation speed Nfixf can be obtained on the basis of a function obtained from the rotating stall line L in the aerodynamic feature map 42. In other words, the point where the constant pressure parameter $\Omega$ line and the rotating stall line L of the aerodynamic feature map 42 intersect indicates the minimum machine Mach number for obtaining that pressure parameter $\Omega$. Therefore, from this minimum machine mach number, the minimum set rotation speed Nfixf of the compressor 3 can be obtained. The above-mentioned function has the form shown in FIG. 4, which shows the Mach number on the rotating stall line L with respect to pressure parameter Ω.

The rotation-speed control unit 15a has an operating state determining unit 43 which, separately from the internal operation to obtain the above-mentioned minimum set rotation speed Nfixf, refers to the aerodynamic feature map 42 and, from the flow parameter θ and the pressure parameter Ω obtained from current state of the turbo chiller 1, it determines whether or not the operating state is in the stable region S or the unstable region NS on the aerodynamic feature map 42. Then, it sets the current minimum rotation speed Nfix separately for the stable region S and the unstable region NS.

When it is determined that current state of the turbo chiller 1 is in the stable region S by the operating state determining unit 43, the current minimum rotation speed Nfix is set as described below.

The fact that the operating state is in the stable region S by referring to the aerodynamic quality map 42 at a vane opening of 100% means that the rotation speed can be reduced further, up to the rotating stall line L. With this reasoning, based on the current flow parameter θ and pressure parameter Ω, the current minimum rotation speed Nfix on the aerodynamic feature map 24 for a vane opening of 100% can be obtained.

Figure 5:
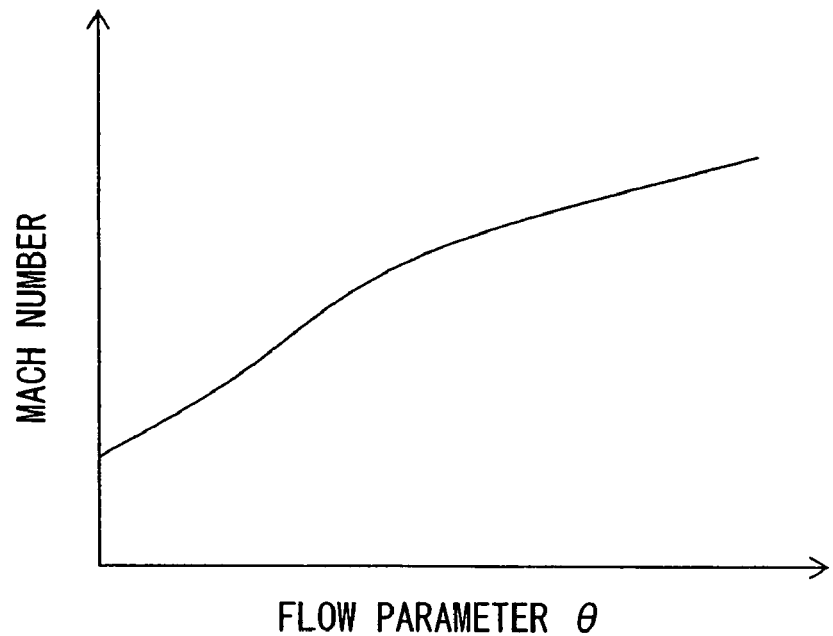
FIG. 5 is a graph showing the relationship between flow parameter $\theta$ and Mach number on the rotating stall line.

First, from the current flow parameter θ, the maximum rotation speed Nmax in order to maintain the current flow parameter θ is obtained. This maximum rotation speed Nmax can be obtained using the fact that, on a constant-θ straight line, the machine Mach number takes the highest value at the intersection of the constant-θ straight line and the rotating stall line L, as can be understood from FIG. 3. The function obtained on the basis of the machine Mach number and the flow parameter θ on this rotating stall line L is shown in FIG. 5.

Figure 4:
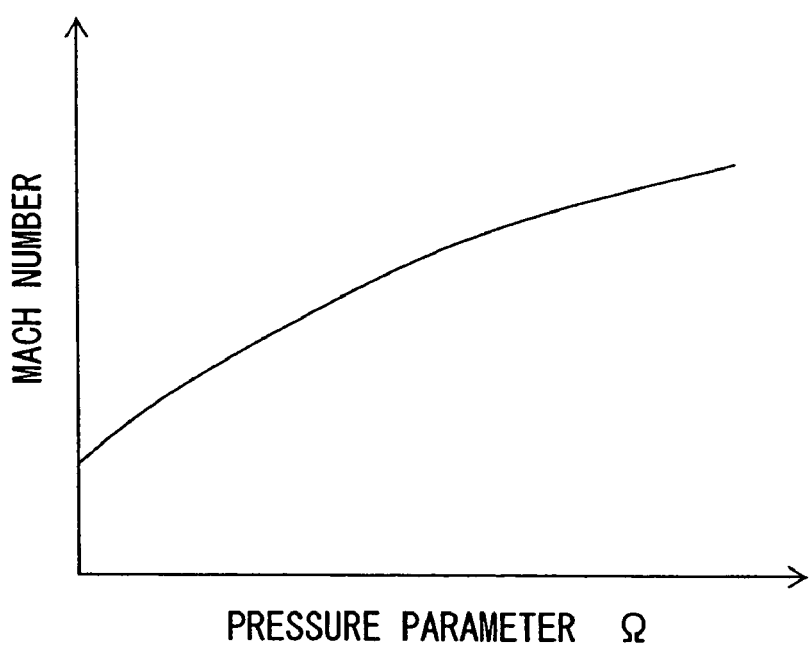
FIG. 4 is a graph showing the relationship between pressure parameter $\Omega$ and Mach number on the rotating stall line.

On the one hand, from the current pressure parameter Ω, the minimum rotation speed Nmin in order to maintain the current pressure parameter Ω is obtained. This minimum rotation speed Nmin can be obtained using the fact that, on a constant-Ω straight line, the machine Mach number takes the lowest value at the intersection of the constant-Ω straight line and rotating stall line L, as can be understood from FIG. 3. The function obtained on the basis of the machine Mach number and the flow parameter θ on this rotating stall line L is as shown in FIG. 4 mentioned above.

Then, the initial value of Nfix is set as the average of the maximum rotation speed Nmax and the minimum rotation speed Nmin obtained as described above. From this initially set value, the calculation shown below is performed repeatedly, increasing the precision of the current minimum rotation speed Nfix.

Using this initial setting for Nfix, the circumferential speed u of the impeller is obtained, and based on this circumferential speed u, the machine Mach number m of the impeller, the 1st pressure coefficient μ, and the flow coefficient ψd are calculated from the equations below.

$$u = \pi \times D \times Nfix$$

$$m = u/a$$

$$\mu = gH/u^2$$

$$\psi d = G/((\pi/4) \times D^2 \times u)$$

Here, D is the outer diameter of the impeller, H is the adiabatic head, and G is the volumetric flow rate of the intake refrigerant. This 1st pressure coefficient μ means the current pressure coefficient of the compressor.

Figure 6:
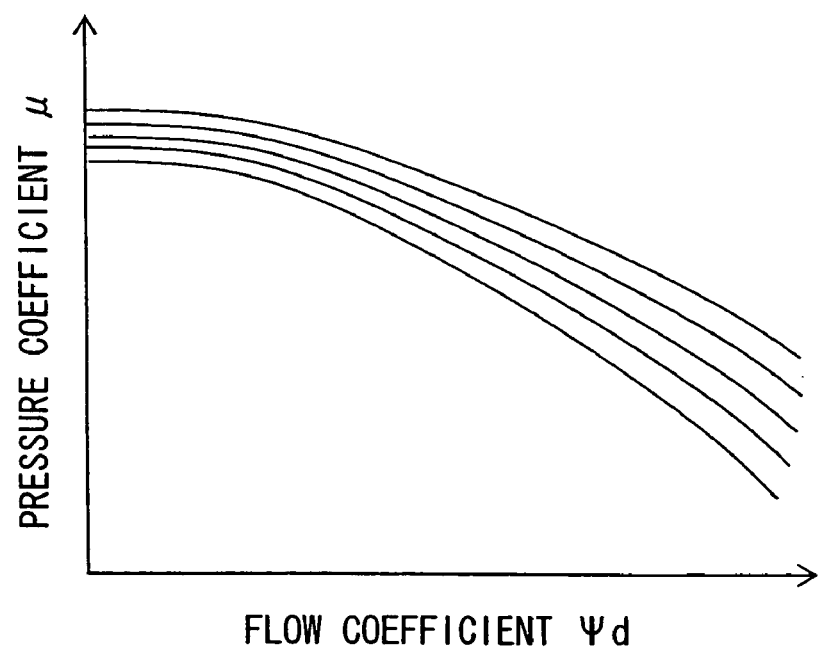
FIG. 6 is a graph showing the relationship between flow coefficient $\psi d$ and pressure coefficient $\mu$.

On the other hand, referring to the data shown in FIG. 6, which is obtained from the aerodynamic features of the compressor, and making use of the calculated flow coefficient ψd and the machine Mach number m, a second pressure coefficient μ' is obtained. The data shown in this figure was obtained by separate tests, and the performance for a single vane is shown. Therefore, the data in this figure is used when designing a vane, and operating the compressor on the lines showing this data gives the highest efficiency. Thus, the second pressure coefficient μ' obtained from this figure can be regarded as the pressure coefficient for which the efficiency is maximized, in the case of a single vane.

The final value of the current minimum rotation speed Nfix is determined by appropriately changing the initially set value of the current minimum rotation speed and repeating the calculation, so that the difference between the first pressure coefficient μ and the second pressure coefficient μ', determined as described above, becomes smaller. In other words, the current minimum rotation speed Nfix is determined so as to match the first pressure coefficient μ, which indicates the current pressure coefficient, to the second pressure coefficient μ', which is the ideal pressure coefficient in terms of the performance of a single vane.

Since Nfix is determined so as to achieve convergence between pressure coefficients μ, the compressor is driven in a state very close to the second pressure coefficient μ', which is the ideal pressure coefficient in terms of the vane performance, and thus highly efficient operation is realized.

Next, the current minimum rotation speed Nfix that is finally set and the set minimum rotation speed Nfixf obtained on the basis of a predetermined chilled water outlet temperature are compared, and the larger rotation speed is defined as the finally instructed rotation speed.

The reason for choosing the larger rotation speed is so that the compressor is never driven in the rotating stall (surging) region, even if the current temperature T1 of the chilled water outlet temperature does not agree with the set value Tset.

For example, when the current chilled water outlet temperature T1 rises above the set chilled water outlet temperature Tset, because a lower temperature for the set chilled water outlet temperature Tset requires a larger volume flow, the set minimum rotation speed Nfixf is higher than the current minimum rotation speed Nfix. In this case, since the inverter 17 is instructed to drive at a rotation speed equal to or greater than the set minimum rotation speed Nfixf, which is high, by a rotation speed designating unit 48 provided in the rotation speed control unit 15a of the control apparatus 15, driving in the stable region S is carried out, and also, the chilled water outlet temperature is controlled so as to fall from the current value T1 to the set value Tset. In this way, the chilled water outlet temperature is controlled so as to converge to the set value.

On the one hand, when the current value T1 of the chilled water outlet temperature falls below the set value Tset, the head becomes insufficient, and there is a tendency for the driving to be in the unstable region. In this case, in order to recover from the insufficient head, the inverter is instructed to drive at a rotation speed greater than or equal to the current minimum rotation speed Nfix, which is high, by the rotation speed instructing unit 48. In this way, since it is operated at a rotation speed at or above the current minimum rotation speed Nfix so as to recover from the insufficient head, operation in the stable region can be achieved.

When it is determined by the operating state determining unit that the current state of the turbo chiller 1 is in the unstable region NS, the minimum rotation speed Nfix is set as described below.

This state just indicates the state on the aerodynamic feature map 42 at a vane opening of 100%, and in the current operating state where the vane opening is 100% or less, it operates without causing surging. However, when the vane opening increases in this state to 100%, rotating stall and accompanying surging are inevitable. Then, even if the vane opening is temporarily increased to 100%, a minimum rotation speed that does not cause surging (vane-opening-dependent minimum rotation speed) is calculated, and operation is performed so as not to fall below this minimum rotation speed.

Figure 7:
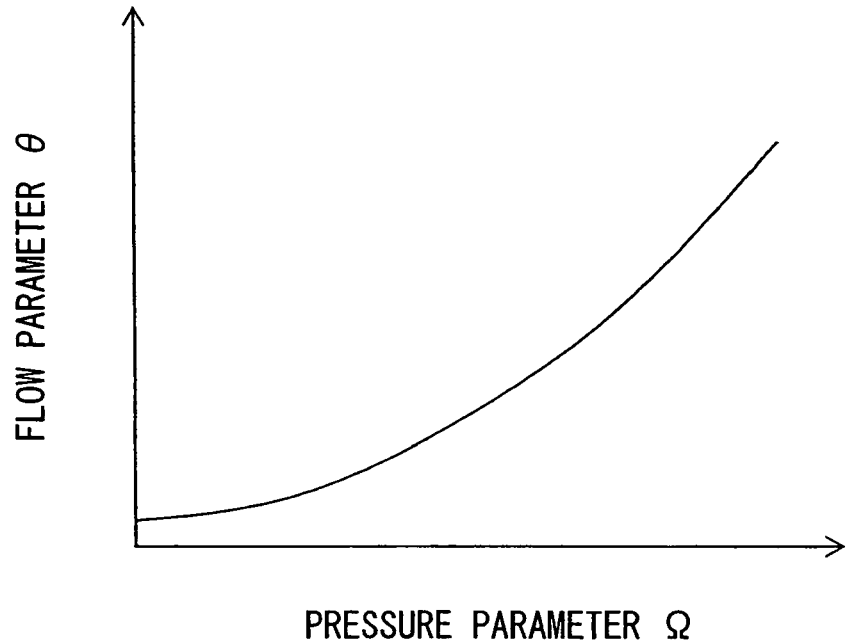
FIG. 7 is a graph showing the relationship between pressure parameter $\Omega$ and flow parameter $\theta$ on the rotating stall line.

First, a minimum flow parameter θmin at the current pressure parameter Ω is determined by means of a function indicating the flow parameter θ with respect to the pressure parameter Ω on the rotating stall line L in the aerodynamic feature map 42 (see FIG. 7).

The flow parameter θ calculated from the current chilled water outlet temperature T1 is divided by the minimum flow parameter θmin, to calculate a volume flow restriction ratio k1.

$$k1 = \theta/\theta\min$$

This volume flow restriction ratio k1 is used to obtain a rotation speed correction coefficient k2. In order to obtain a minimum rotation speed that does not fall into the unstable region so as to maintain the current volume flow even when the rotation speed falls and the vane opening rises to 100%, the rotation speed correction coefficient k2 corrects the minimum rotation speed at the vane opening of 100%. The relationship between this rotation speed correction coefficient k2 and the volume flow restriction coefficient k1 is obtained from the results of additional tests in which the inlet vane 13 is throttled.

Using this rotation speed correction coefficient k2, the minimum rotation speed Nfix is set by correcting the minimum rotation speed obtained from the pressure parameter Ω based on the function shown in FIG. 4.

Next, the expansion valve opening control unit 15b in the control apparatus 15 is described.

Figure 8:
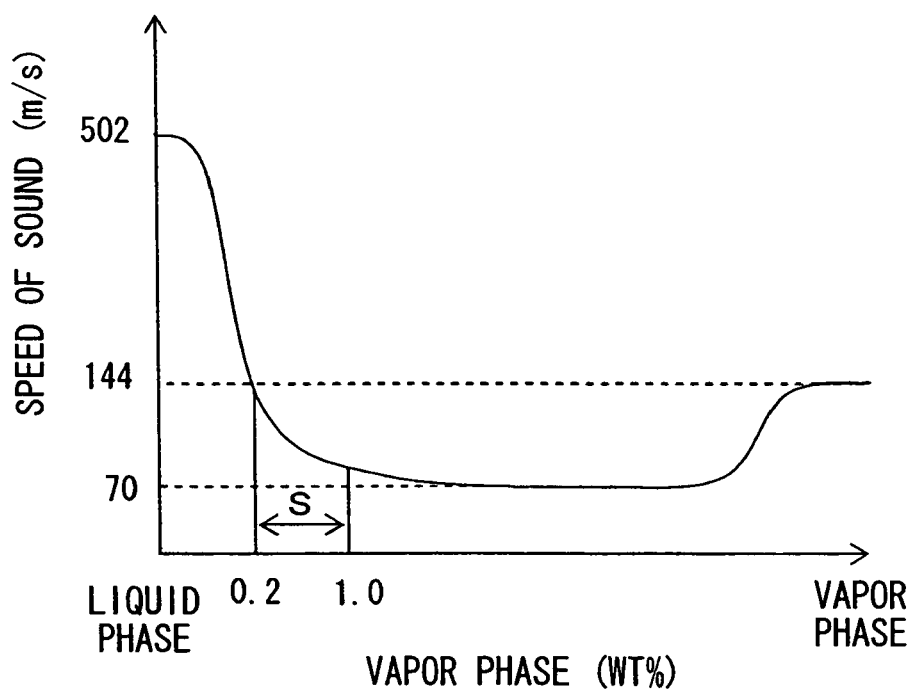
FIG. 8 is a graph showing the speed of sound versus phase change state of a refrigerant (R134a).

First, the state of the refrigerant flowing through the expansion valve 7 will be described. The refrigerant flowing through the expansion valve 7 increases in speed toward the speed of sound when throttled by the expansion valve 7 and flows to the evaporator 9 side. The speed of sound of the refrigerant at this time not only changes depending on whether the refrigerant is in the liquid phase or vapor phase, but it also strongly varies in the case of a vapor-liquid two-phase state. FIG. 8 shows this state. In the figure, the horizontal axis indicates the ratio (weight percent) of the vapor phase with respect to the total weight, and the vertical axis indicates the speed of sound (m/s). This graph shows the speed of sound when the refrigerant is R134a (at standard temperature, 25° C.). As can be understood from this figure, the speed of sound generally becomes larger (502 m/s) in the case of the liquid phase, but in the vapor-liquid two-phase region, the speed of sound is considerably reduced. After remaining steady at a fixed speed of sound (about 70 m/s), the speed of sound increases again near the vapor phase, and eventually reaches the vapor-phase speed of sound (144 m/s).

Furthermore, as can be understood from this figure, after the speed of sound drops relatively suddenly in the vapor-liquid two-phase region, there is a speed-of-sound reduction transition region S where the rate of reduction of the speed of sound decreases. In the case of the R134a refrigerant, this speed-of-sound reduction transition region S is from 0.2 to 1.0 wt %.

The expansion valve opening control unit 15b according to this embodiment controls the expansion valve 7 so as to be within the speed-of-sound reduction transition region S.

Concretely, before shipping the turbo chiller 1, operational tests are carried out on the turbo chiller 1 in the factory, and a control program for the expansion valve opening control unit 15b is adjusted so that the expansion valve 7 is driven in the speed-of-sound reduction transition region S in the operating range of the chiller.

In other words, the Cv value of the expansion valve 7 is obtained from relationship between the pressure before and after the expansion valve 7 (the condenser pressure and evaporator pressure) and the refrigerant flow rate. This gives a range of Cv values for operating in the speed-of-sound reduction transition region S. Then, the control program for calculating a command value of the expansion valve opening control unit 15b is adjusted so as to output a command value for the degree of opening that corresponds to the Cv value for operating in the speed-of-sound reduction transition region S.

The expansion valve opening control unit 15b adjusted in this way commands a valve opening (Cv value) that corresponds to a desired condenser pressure Pc, evaporator pressure Pe, and refrigerant flow rate G. Because this command value is adjusted to the valve opening for operating in the speed-of-sound reduction transition region S, operation is always carried out in the speed-of-sound reduction transition region S. The valve opening is controlled so that the vapor-phase ratio is from 0.2 to 1.0 wt %, and more preferably 0.4 wt %.

Using the control apparatus 15 above, the turbo chiller 1 is operated as described in the following.

When starting, the set input speed-up rate is increased to the specified rotation speed. Then, after commencing start-up, when a predetermined period of time has elapsed, the inlet vane 13 is set at a minimum opening, and the opening of the expansion valve 7 is temporarily fixed (for example, at 70%).

When the speed has completed increasing to the specified rotation speed, control of the HGBP valve 25 and the inlet vane 13 begins.

Thereafter, when a predetermined period of time has elapsed, control of the expansion valve 7 begins. Then, rotation speed control by the control apparatus 15 begins.

Based on the set chilled water outlet temperature Tset, the control apparatus 15 constantly maintains the set minimum rotation speed Nfixf.

On the other hand, based on the current evaporator pressure Pe, the current condenser pressure Pc, and the current chilled water outlet temperature T1 of the turbo chiller, the control apparatus 15 calculates the current minimum rotation speed Nfix.

Then, the control apparatus 15 selects the larger rotation speed of the set minimum rotation speed Nfixf and the current minimum rotation speed Nfix, and transmits an instructed frequency corresponding to this rotation speed to the inverter 17.

Also, by means of the expansion valve opening control unit 15b, the control apparatus 15 instructs a valve opening (Cv value) corresponding to the desired condenser pressure Pc, evaporator pressure Pe, and refrigerant flow rate G.

In this way, since the turbo chiller of this embodiment determines the current operating state of the compressor by using the aerodynamic feature map 42, which reflects the cooling capacity Q, it is possible to perform driving that closely corresponds to the operating conditions of the turbo chiller 1.

Also, since the minimum rotation speed is set based on the rotating stall line L in the aerodynamic feature map 42, it is possible to constantly drive the compressor in a stable state.

Furthermore, since the minimum rotation speed is set in the current operational state, the maximum vane opening can be realized, and pressure loss resulting from a large increase in undesirable flow resistance at the inlet vane 13 does not occur.

Moreover, because maximum vane opening can be realized, low-noise operation is possible.

In addition, because the valve opening controlled by the expansion valve opening control unit 15b is set so as to operate in the speed-of-sound reduction transition region S where the rate of change of the speed of sound is comparatively small, the refrigerant flow rate can be stably controlled. Because the chiller is operated in the vapor-liquid two-phase region, the height of the liquid surface of the refrigerant in the condenser can be quickly reduced compared to the case where it is operated in the liquid phase, and an increase in condenser pressure can be suppressed. As a result, it is possible to keep the power loss of the compressor low.

Furthermore, the set chilled water outlet temperature Tset is not limited to a fixed value; it can be adjusted to any desired value. In this case, a configuration in which the set chilled water outlet temperature Tset is transmitted to the control apparatus 15 after being adjusted is adopted.

Moreover, although a description has been given concerning chilled water output, likewise in the case of warm water output, control is carried out on the basis of the output from the warm water outlet temperature sensor 21b in the warm water obtaining device 21a.

What is claimed is:

1. A turbo chiller comprising:
    an evaporator,
    a condenser,
    an expansion valve opening control device which controls a degree of opening of an expansion valve provided between the condenser and the evaporator, and
    a compressor of comprising:
        an inverter-driven electric motor which is driven by an inverter and subjected to rotation speed control;
        a turbo compressor unit which is rotated by the inverter-driven electric motor to compress an intake refrigerant; and
        a rotation-speed control device which controls the rotation speed of the turbo compressor unit by means of a control signal transmitted to the inverter;
    wherein the rotation-speed control device is provided with an aerodynamic feature map indicating a rotating stall line at which rotating stall occurs, on a map represented by a first parameter reflecting a volume flow based on an output thermal capacity of the chiller and by a second parameter that reflects a head based on an evaporator pressure, a condenser pressure, and the output thermal capacity; and
    wherein the rotation-speed control device includes:
        a minimum rotation speed obtaining unit that obtains a minimum rotation speed from the second parameter and the rotating stall line on the aerodynamic feature map at a current operating state; and
        a rotating speed instructing unit for instructing the inverter to drive at a rotation speed greater than or equal to the minimum rotation speed obtained in the minimum rotating speed obtaining units,
    wherein the expansion valve opening control device controls the expansion valve to be in a speed-of-sound reduction transition region, from a liquid phase state to a vapor-liquid two-phase state, where a rate of decrease of the speed of sound of the refrigerant is reduced.

2. The turbo chiller according to claim 1, wherein said compressor further comprises:
    a chilled water obtaining device which takes in chilled water from the evaporator, the output thermal capacity being calculated on the basis of a chilled water outlet temperature of the chilled water obtaining device in the case of chilled water output; or a warm water obtaining device which takes in warm water from the condenser, the output thermal capacity being calculated on the basis of a warm water outlet temperature of the warm water obtaining device in the case of warm water output;
    wherein the rotation speed control device comprises:
        a set minimum rotation speed obtaining unit which obtains a set minimum rotation speed from the rotating stall line on the aerodynamic feature map based on a set chilled water outlet temperature or a set warm water outlet temperature, which have set values; and
        a current minimum rotation speed obtaining unit which obtains a current minimum rotation speed from the rotating stall line on the aerodynamic feature map based on a current chilled water outlet temperature or warm water outlet temperature; and
    wherein the rotation speed instructing unit instructs the inverter to drive at an instructed rotation speed that is equal to or greater than the higher rotation speed of the set minimum rotation speed and the current minimum rotation speed.

3. The turbo chiller according to claim 2, wherein said compressor further comprises:
    an inlet vane which adjusts the flow rate of refrigerant flowing into the turbo compressor unit;
    wherein the aerodynamic feature map is provided with a maximum-opening map which shows data at a time of maximum opening of the inlet vane;
    wherein the rotation speed control device includes:
        an operating state determining unit which determines, according to the maximum-opening map, whether the current operating state is in a stable region where rotating stall does not occur or in an unstable region where rotating stall occurs; and
        a vane-opening-dependent minimum rotation speed obtaining device which obtains a vane-opening-dependent-minimum rotation speed for the current vane opening by correcting a minimum rotation speed obtained from the maximum-opening map;
    wherein, when the operating state determining unit determines that the current operating state is in the stable region, the rotation speed instructing unit instructs the inverter to drive at an instructed rotation speed that is greater than or equal to the higher rotation speed of the set minimum rotation speed and the current minimum rotation speed; and
    wherein, when the operating state determining device determines that the current operating state is in the unstable region, the rotating speed instructing unit instructs the inverter to drive at the vane-opening-dependent minimum rotation speed obtained by the vane-opening-dependent minimum rotation speed obtaining unit.

4. A control method of a compressor of a turbo chiller, said turbo chiller including an evaporator, a condenser, an expansion valve opening control device which controls a degree of opening of an expansion valve provided between the condenser and the evaporator, and said compressor, said compressor including an inverter-driven electric motor that is driven by an inverter and subjected to rotation speed control, and a turbo compressor unit that is rotated by the inverter-driven electric motor to compress an intake refrigerant, the control method controlling the rotation speed of the turbo compressor unit by means of a control signal transmitted to the inverter, the control method comprising:

utilizing an aerodynamic feature map indicating a rotating stall line at which rotating stall occurs, on a map represented by a first parameter reflecting a volume flow based on a cooling capacity of an evaporator and by a second parameter reflecting a head based on the evaporator pressure and a condenser pressure;

obtaining a minimum rotation speed from the second parameter and the rotating stall line on the aerodynamic feature map in a current operating state; and instructing the inverter to drive at a rotation speed greater than or equal to the minimum rotation speed obtained in the minimum rotation speed obtaining step, wherein the expansion valve opening control device controls the expansion valve to be in a speed-of-sound reduction transition region, from a liquid phase state to a vapor-liquid two-phase state, where a rate of decrease of the speed of sound of the refrigerant is reduced.

* * * * *